(12) United States Patent
Hong et al.

(10) Patent No.: US 10,767,602 B2
(45) Date of Patent: Sep. 8, 2020

(54) ENGINE SYSTEM (71) Applicants: HYUNDAI MOTOR COMPANY, Seoul (KR); KIA MOTORS CORPORATION, Seoul (KR)

(72) Inventors: Seungwoo Hong, Seoul (KR); Jong Il Park, Seoul (KR); Hyungbok Lee, Seongnam-Si (KR); Heechang Oh, Suwon-Si (KR); Yeongseop Park, Seoul (KR); Dong Hee Han, Seoul (KR); Joowon Lee, Yongin-Si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 65 days.

(21) Appl. No.: 16/190,949

(22) Filed: Nov. 14, 2018

(65) Prior Publication Data

US 2019/0186427 A1 Jun. 20, 2019

(30) Foreign Application Priority Data

Dec. 14, 2017 (KR) ........................ 10-2017-0171814

(51) Int. Cl.
| | |
|---|---|
| *F02M 26/09* | (2016.01) |
| *F02M 35/10* | (2006.01) |
| *F02B 39/10* | (2006.01) |
| *F02B 29/04* | (2006.01) |
| *F02M 26/08* | (2016.01) |
| *F02M 26/17* | (2016.01) |
| *F02M 26/14* | (2016.01) |

(52) U.S. Cl.
CPC ............ *F02M 26/09* (2016.02); *F02B 29/04* (2013.01); *F02B 39/10* (2013.01); *F02M 26/08* (2016.02); *F02M 26/14* (2016.02); *F02M 26/17* (2016.02); *F02M 35/10157* (2013.01); *F02M 35/10222* (2013.01)

(58) Field of Classification Search
CPC .......... F02B 37/04; F02B 37/10; F02B 39/10; F02B 29/04; F02M 26/09; F02M 35/10157; F02M 26/08; F02M 26/17; F02M 35/10222; F02M 26/14
See application file for complete search history.

(56) References Cited

U.S. PATENT DOCUMENTS

| | | | | |
|---|---|---|---|---|
| 10,344,688 | B2 * | 7/2019 | Han | .................... F02B 37/04 |
| 2001/0054287 | A1 * | 12/2001 | Hoecker | ................ F02M 26/08 |
| | | | | 60/612 |

(Continued)

FOREIGN PATENT DOCUMENTS

WO   WO-2017211564 A1 * 12/2017 ............. F02B 39/10

Primary Examiner — Matthew T Largi
(74) Attorney, Agent, or Firm — Morgan, Lewis & Bockius LLP (57) ABSTRACT An engine system includes: an engine having a combustion chamber generating a driving torque by combust of a fuel; a plurality of intake lines through which outside air flows to the combustion chamber; an exhaust manifold connected to the combustion chamber at an exhaust side; at least two electric superchargers disposed on the plurality of intake lines, respectively; and an exhaust gas recirculation (EGR) system including a recirculation line branched from the exhaust manifold and joined to one of the plurality of intake lines and a recirculation valve disposed on the recirculation line.

12 Claims, 8 Drawing Sheets

(56) References Cited

U.S. PATENT DOCUMENTS

| | | | |
|---|---|---|---|
| 2008/0047525 A1* | 2/2008 | Morizane | F02B 37/04 |
| | | | 123/344 |
| 2009/0007563 A1* | 1/2009 | Cooper | F02B 33/32 |
| | | | 60/600 |
| 2016/0245155 A1* | 8/2016 | Iwata | F02B 37/10 |

* cited by examiner

ENGINE SYSTEM

CROSS-REFERENCE TO RELATED APPLICATION

This application claims priority to and the benefit of Korean Patent Application No. 10-2017-0171814 filed in the Korean Intellectual Property Office on Dec. 14, 2017, the entire contents of which are incorporated herein by reference.

TECHNICAL FIELD

The present disclosure relates to an engine system. More particularly, the present disclosure relates to an engine system including an exhaust gas recirculation (EGR) device of a new structure.

BACKGROUND

An engine of a vehicle combusts a mixture of air inflowing from outside and a fuel with an appropriate ratio to generate a power.

In a process of generating the power by driving the engine, external air for the combustion must be appropriately supplied to obtain a desired output and combustion efficiency. For this, a turbocharger as a device for turbocharging the air for the combustion to increase the combustion efficiency of the engine is used.

In general, a turbocharger is a device that rotates a turbine by using pressure of exhaust gas discharged from an engine and thereby increases output of the engine by supplying high-pressure air to a combustion chamber by using rotational force thereof. The turbocharger is applied to most diesel engines and has also recently been applied to gasoline engines.

As another example of an intake boost device, an electric supercharger using a motor to drive a compressor to compress external air has been used. Since the electric supercharger is driven by a battery, there is little boost, and it mainly supplies supercharged air to the cylinder in a low speed and low load region.

In general, the turbocharger (hereinafter referred to as 'a mechanical turbocharger') operated by the exhaust gas has low responsiveness, and it is difficult to realize a high compression ratio because of a magnitude of a back pressure. Since the turbocharger is exposed to an exhaust gas of high temperature (about, 700° C.), a design cost of turbocharger surrounding components increases.

Nitrogen oxide (nitrous oxide; NOx) within an exhaust gas exhausted from the engine causes acid rain, stimulates eyes and respiratory organs, and kills plants. NOx is regulated as an atmospheric pollution source and there has been an effort to lessen exhaust of NOx.

An exhaust gas recirculation (EGR) system has been provided to a vehicle for reducing noxious exhaust gas. Generally, NOx is increased in a case where an air-fuel ratio of an air-fuel mixture is high, which is necessary for sufficient combustion. Thus, the exhaust gas recirculation system mixes an exhaust gas from an engine to the air-fuel mixture, for example 5-20%, thereby reducing the amount of oxygen in the air-fuel mixture and obstructing from combustion, and so lessening generation of NOx.

The general exhaust gas recirculation system recirculates the exhaust gas exhausted through an exhaust manifold from the cylinder of the engine and flowing to the exhaust line into the cylinder of the engine through the recirculation line, and an EGR valve is mounted on the recirculation line to control an EGR rate.

The exhaust gas recirculation system may be classified into a low pressure EGR (LP EGR: low pressure exhausted gas recirculation) system and a high pressure EGR (HP EGR: high pressure exhausted gas recirculation) system.

In the conventional exhaust gas recirculation system, the exhaust gas is recirculated through the EGR line that is branched from the exhaust line flowing the exhaust gas and is joined into the intake line. In this case, in the EGR line, an EGR cooler cooling the recirculated exhaust gas and an EGR valve controlling the recirculated exhaust gas amount are installed.

Among the conventional exhaust gas recirculation apparatus, in the high pressure EGR system as a method supplying the recirculation gas (the EGR gas) to the intake manifold by using high pressure of the exhaust manifold, since a difference pressure is low between the exhaust manifold and the intake manifold in a driving region (e.g., the supercharged air is supplied by the turbocharger or the electric supercharger) that the pressure of the intake manifold increases, it is difficult to supply the recirculation gas and the driving region that the recirculation gas is supplied is limited.

In the low pressure EGR system as a method supplying the recirculation gas to the intake line of a compressor upper stream of the turbocharger from the exhaust line of the exhaust gas purification device lower stream, when the recirculation gas is supplied, since a fresh air supply amount decreases, the driving region that the recirculation gas is supplied is limited. There are problems that a control logic for supplying the recirculation gas is complicated and a manufacturing cost increases.

As above-described, in conventional, since the exhaust gas recirculation device must be additionally provided for the exhaust gas recirculation, the manufacturing cost of the vehicle increases and a design freedom of the engine room inside is poor.

The above information disclosed in this Background section is only for enhancement of understanding of the background of the invention and therefore it may contain information that does not form the prior art that is already known in this country to a person of ordinary skill in the art.

SUMMARY

The present disclosure provides an engine system of a new structure in which a driving region expands for supplying recirculation gas.

An engine system according to an exemplary embodiment of the present disclosure includes: an engine having a combustion chamber generating a driving torque by combust of a fuel; a plurality of intake lines through which outside air flows to the combustion chamber; an exhaust manifold connected to the combustion chamber at an exhaust side; at least two electric superchargers disposed the plurality of intake lines, respectively; and an exhaust gas recirculation (EGR) device including a recirculation line branched from the exhaust manifold and joined to one of the plurality of intake lines and a recirculation valve disposed on the recirculation line.

The plurality of intake lines may include a first intake line through which outside air is supplied to the combustion chamber, the second intake line through which outside air is supplied to the combustion chamber, and a bypass line connecting the first intake line and the second intake line.

The engine system may further include: a first intake valve disposed on the first intake line; a second intake valve disposed on the second intake line; and a bypass valve disposed on the bypass line.

The first intake valve may be disposed on a lower stream of the first electric supercharger, and the second intake valve may be disposed on an upper stream of the second electric supercharger.

The recirculation line may be branched from the exhaust manifold and joined to the second intake line between the second intake valve and the second electric supercharger.

The recirculation line may be branched from the exhaust manifold and joined to the bypass line between the bypass valve and the second electric supercharger.

In a driving region that recirculation gas is supplied to the combustion chamber, the first intake valve may be open to operate the first electric supercharger by outside air and the second intake valve and the recirculation valve may be closed to operate the second electric supercharger by recirculation gas.

The first intake line and the second intake line may be joined to the main intake line, and a main intercooler may be disposed on the main intake line.

The engine system according to an exemplary embodiment of the present disclosure may further include a secondary intercooler disposed on the bypass line.

An engine system according to another exemplary embodiment of the present disclosure includes: an engine having a combustion chamber generating a driving torque by combust of a fuel; a plurality of intake lines through which outside air flows to the combustion chamber; an exhaust manifold connected to the combustion chamber at an exhaust side; an exhaust line which is connected to the exhaust manifold and through which exhaust gas flows; an exhaust gas purification device disposed on the exhaust line; at least two electric superchargers disposed on the plurality of intake lines, respectively; and an EGR device including a recirculation line branched from the exhaust line at a lower stream of the exhaust gas purification device and joined to one of the plurality of intake lines and a recirculation valve disposed on the recirculation line.

The plurality of intake lines may include a first intake valve disposed on a first intake line through which outside air is supplied to the combustion chamber; a second intake valve disposed on a second intake line through which outside air is supplied to the combustion chamber; and a bypass valve disposed on a bypass line connecting the first intake line and the second intake line.

The first intake valve may be disposed on a lower stream of the first electric supercharger, and the second intake valve may be disposed on an upper stream of the second electric supercharger.

The recirculation line may be branched from the exhaust manifold and joined to the second intake line between the second intake valve and the second electric supercharger.

The recirculation line may be branched from the exhaust manifold and joined to the bypass line between the bypass valve and the second electric supercharger.

In a driving region that recirculation gas is supplied to the combustion chamber, the first intake valve may be open to operate the first electric supercharger by outside air, the second intake valve and the recirculation valve may be closed to operate the second electric supercharger by recirculation gas.

The first intake line and the second intake line may be joined to the main intake line, and a main intercooler is disposed on the main intake line.

The engine system may further include a secondary intercooler disposed on the bypass line.

As above-described, according to the engine system according to the exemplary embodiment of the present disclosure, the driving region that recirculation gas is supplied expands, thereby improving a fuel consumption of the vehicle.

BRIEF DESCRIPTION OF THE DRAWINGS

While the drawings are described in connection with what is presently considered to be practical exemplary embodiments, it is to be understood that the invention is not limited to the disclosed drawings.

DETAILED DESCRIPTION OF THE EMBODIMENTS

The present disclosure will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

The unrelated parts to the description of the exemplary embodiments are not shown to make the description clear and like reference numerals designate like element throughout the specification.

The sizes and thicknesses of the configurations shown in the drawings are provided selectively for the convenience of description, such that the present disclosure is not limited to those shown in the drawings and the thicknesses are exaggerated to make some parts and regions clear.

Hereinafter, an engine system according to an exemplary embodiment of the present disclosure will be described with reference to accompanying drawings.

Figure 1:
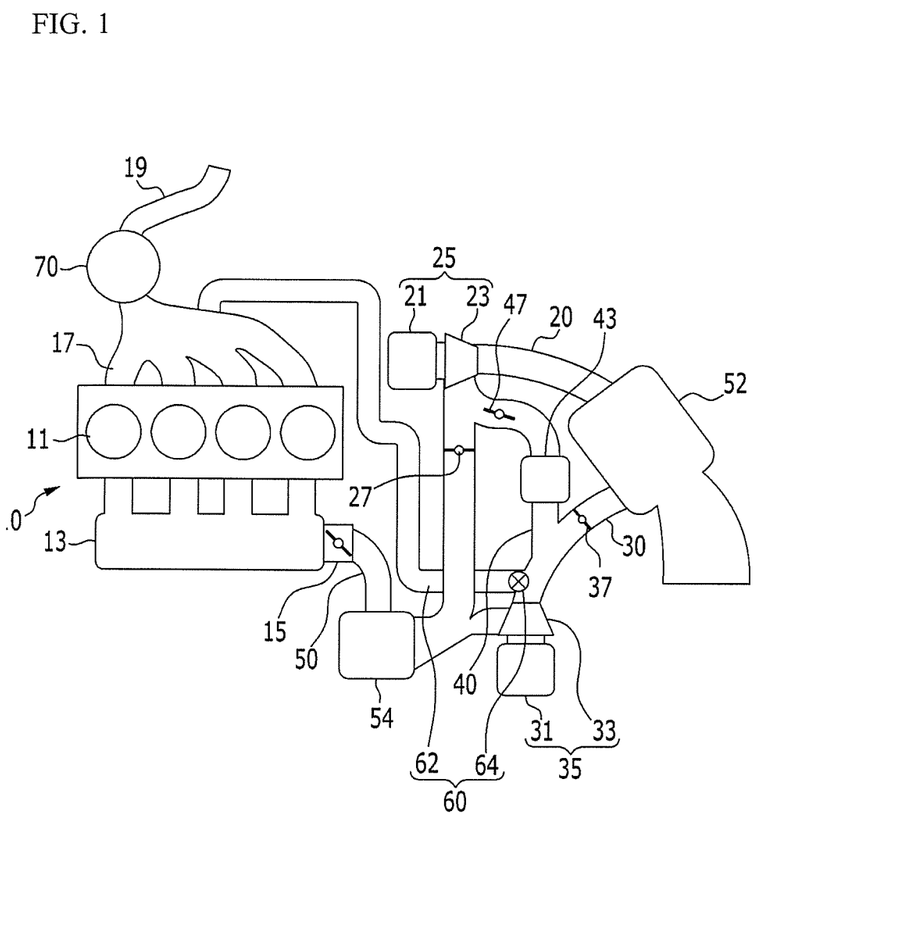
FIG. 1 is a schematic view of configurations of an engine system according to an exemplary embodiment of the present disclosure.
Figure 2:
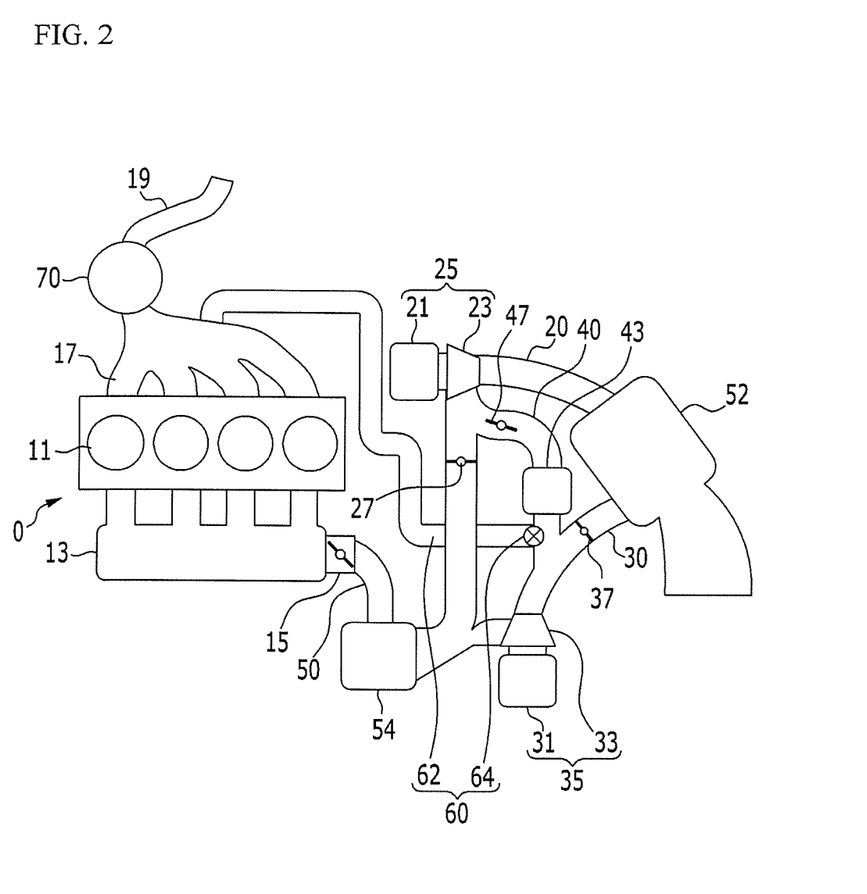
FIG. 2 is a schematic view of configurations of an engine system according to another exemplary embodiment of the present disclosure.
Figure 3:
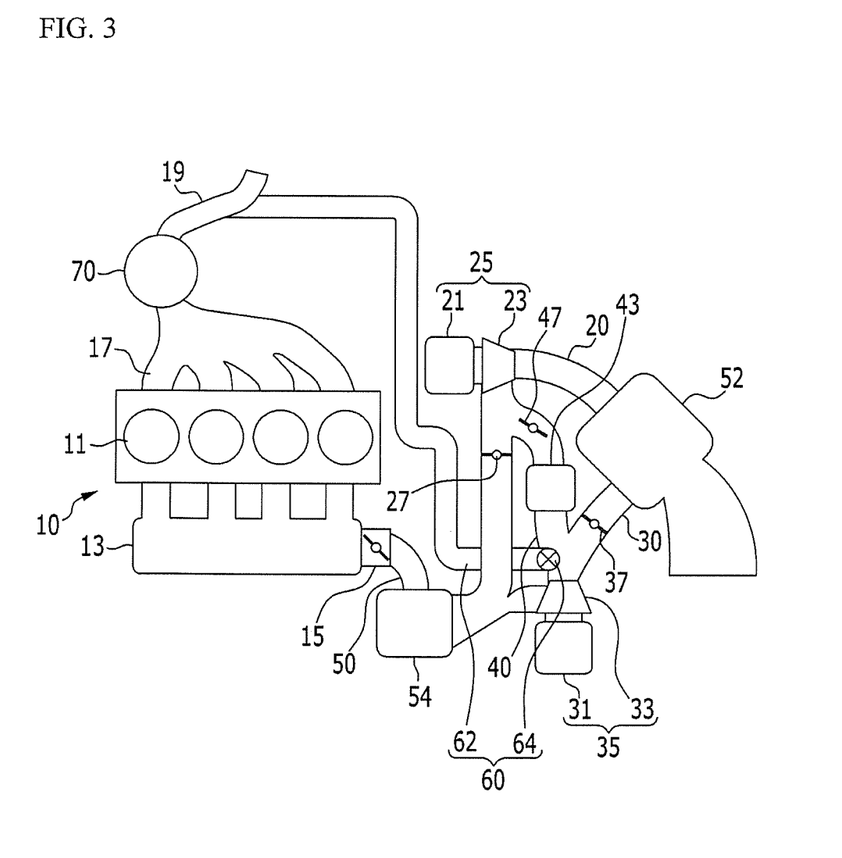
FIG. 3 is a schematic view of configurations of an engine system according to another exemplary embodiment of the present disclosure.
Figure 4:
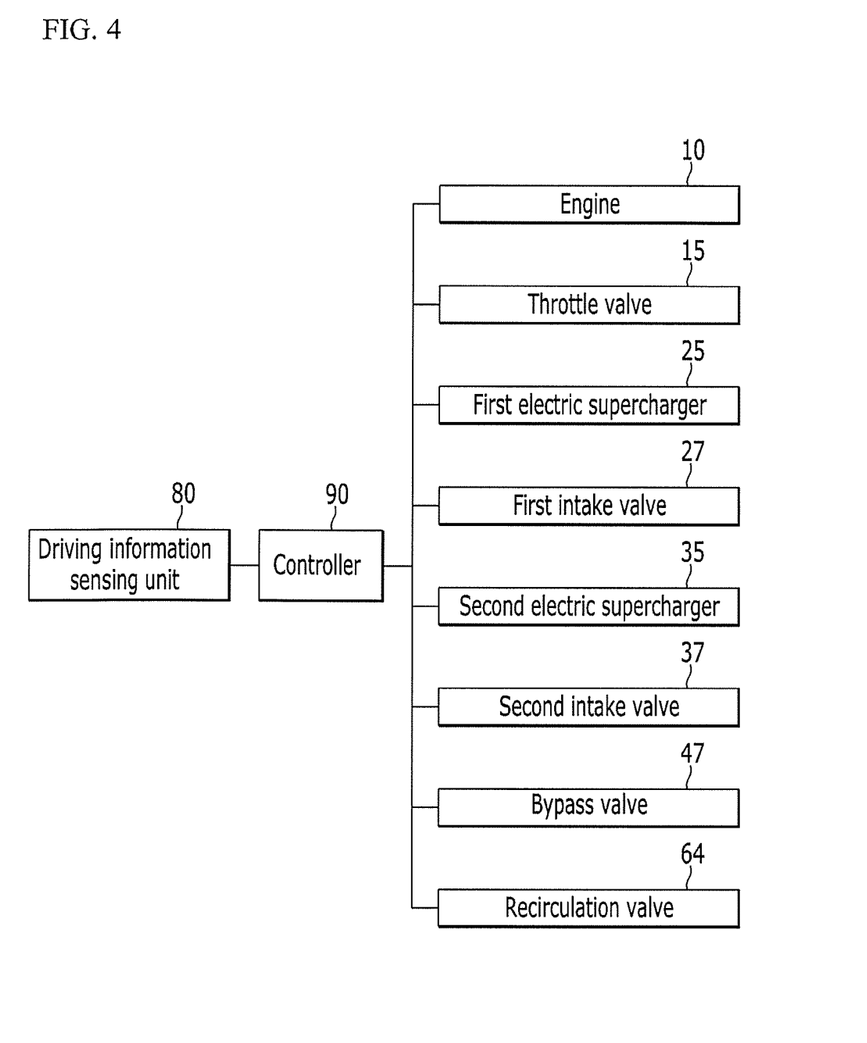
FIG. 4 is a block diagram of configurations of an engine system according to an exemplary embodiment of the present disclosure.

FIG. 1 is a schematic view of configurations of an engine system according to an exemplary embodiment of the present disclosure. FIG. 2 is a schematic view of configurations of an engine system according to another exemplary embodiment of the present disclosure. FIG. 3 is a schematic view of configurations of an engine system according to another exemplary embodiment of the present disclosure. FIG. 4 is a block diagram of configurations of an engine system according to an exemplary embodiment of the present disclosure.

As shown in FIG. 1 to FIG. 4, an engine system according to an exemplary embodiment of the present disclosure includes an engine 10, a plurality of intake line, an electric supercharger installed on each of the plurality of intake lines, and an exhaust gas recirculation (EGR) device 60 resupplying a part (hereinafter, referred to as 'recirculation gas') of an exhaust gas exhausted from the engine 10.

The engine includes a plurality of combustion chambers 11 generating a driving torque by a combust of a fuel, an intake air supplied to the combustion chambers 11 is supplied through the plurality of intake lines, and the exhaust gas exhausted from the combustion chambers 11 of the engine 10 is exhausted outside through an exhaust manifold 17 and an exhaust line 19. In this case, an exhaust gas purification device 70 for purifying the exhaust gas is installed on the exhaust line 19.

The plurality of intake lines includes a first intake line 20 to which an outside air supplied to the combustion chamber 11 flows and a second intake line 30 to which the outside air supplied to the combustion chamber 11. However, the scope of the present disclosure is not limited thereto.

Between the first intake line 20 and the second intake line 30, a bypass line 40 connecting the first intake line 20 and the second intake line 30 is installed. That is, the bypass line 40 is branched from the first intake line 20 and is joined to the second intake line 30.

The electric supercharger installed on each of the first intake line 20 and the second intake line 30 is to supply the supercharged air to the combustion chamber 11 and include a motor and an electric compressor. The electric compressor is operated by the motor to compress the outside air and to be supplied to the combustion chamber 11 according to an driving condition.

A first intake valve 27 is installed on the first intake line 20. In detailed, the first intake valve 27 may be installed on the lower stream of the first electric supercharger 25 installed on the first intake line 20. The intake air amount supplied through the first intake line 20 is controlled by an opening of the first intake valve 27.

The second intake valve 37 is installed on the second intake line 30. In detail, the second intake valve 37 may be installed on the lower stream of the second electric supercharger 35 installed on the second intake line 30. The intake air amount supplied through the second intake line 30 is controlled by an opening of the second intake valve 37.

The first intake line 20 and the second intake line 30 are joined into the main intake line 50 and the main intercooler 54 may be installed on the main intake line 50. The air compressed by the electric supercharger is cooled by the main intercooler 54.

The bypass valve 47 is installed on the bypass line 40. In this case, a secondary intercooler 43 may be installed on the bypass line 40. The air compressed by the first electric supercharger 25 is cooled by the secondary intercooler 43.

An air cleaner 52 for filtering the outside air inflowing from the outside is mounted on an inlet of the first intake line 20 and the second intake line 30.

The intake air inflowing through the first intake line 20 and the second intake line 30 is supplied to the combustion chamber 11 through the intake manifold 13. A throttle valve 15 is mounted on the intake manifold 13 to control the air amount supplied to the combustion chamber 11.

As shown in FIG. 1, the EGR device 60 may include a recirculation line 62 branched from the exhaust manifold 17 and joined to one intake line among the plurality of intake lines and a recirculation valve 64 installed on the recirculation line 62. The recirculation gas amount supplied to the combustion chamber 11 of the engine 100 is controlled through the opening of the recirculation valve 64.

The recirculation line 62 may be branched from the exhaust manifold 17 and joined to the second intake line 30 between the second intake valve 37 and the second electric supercharger 35 (refer to FIG. 1), or may be branched from the exhaust manifold 17 and joined to the bypass line 40 between the bypass valve 47 and the second electric supercharger 35 (refer to FIG. 2).

As shown in FIG. 3, the EGR device 60 may include the recirculation line 62 branched from the exhaust line 19 of the lower stream of the exhaust gas purification device 70 and joined to one intake line among the plurality of intake lines and the recirculation valve 64 installed on the recirculation line 62. Compared with FIGS. 1 and 2, the recirculation line 62 is branched from the exhaust line of the exhaust gas purification device lower stream as a difference from the exemplary embodiment of FIG. 1.

Referring to FIG. 4, the engine system according to an exemplary embodiment of the present disclosure may further include a driving information sensor 80 sensing a driving information of the vehicle and a controller 90 controlling the operations of the first intake valve 27, the second intake valve 37, the bypass valve 47, the first electric supercharger 25, the second electric supercharger 35, the recirculation valve 64, and the throttle valve 15 according to the driving information.

The driving information sensor 80 senses the driving information including an engine torque, an engine speed, a requirement torque, etc. of the driver and the sensed driving information is transmitted to the controller 90.

The controller 90 may be implemented by one or more processors operated by a predetermined program, in which the predetermined program is set to perform steps of the control method of the engine system according to an exemplary embodiment of the present disclosure.

Hereinafter, the operation of the engine system according to an exemplary embodiment of the present disclosure is described in detail with reference to accompanying drawings.

The controller 90 determines the driving region of the engine from the driving information sensed from the driving information sensor 80. In this case, the driving region may be divided into a low/medium speed a high load region, and a high speed high load region.

The controller 90 controls the supercharged air supplied to the combustion chamber 11 through the control of the first intake valve 27, the second intake valve 37, and the bypass valve 47 according to the driving region of the engine. That is, the controller 90 controls the first intake valve 27, the second intake valve 37, and the bypass valve 47 to be closed or opened, thereby controlling the supercharged air amount supplied to the combustion chamber 11.

Figure 5:
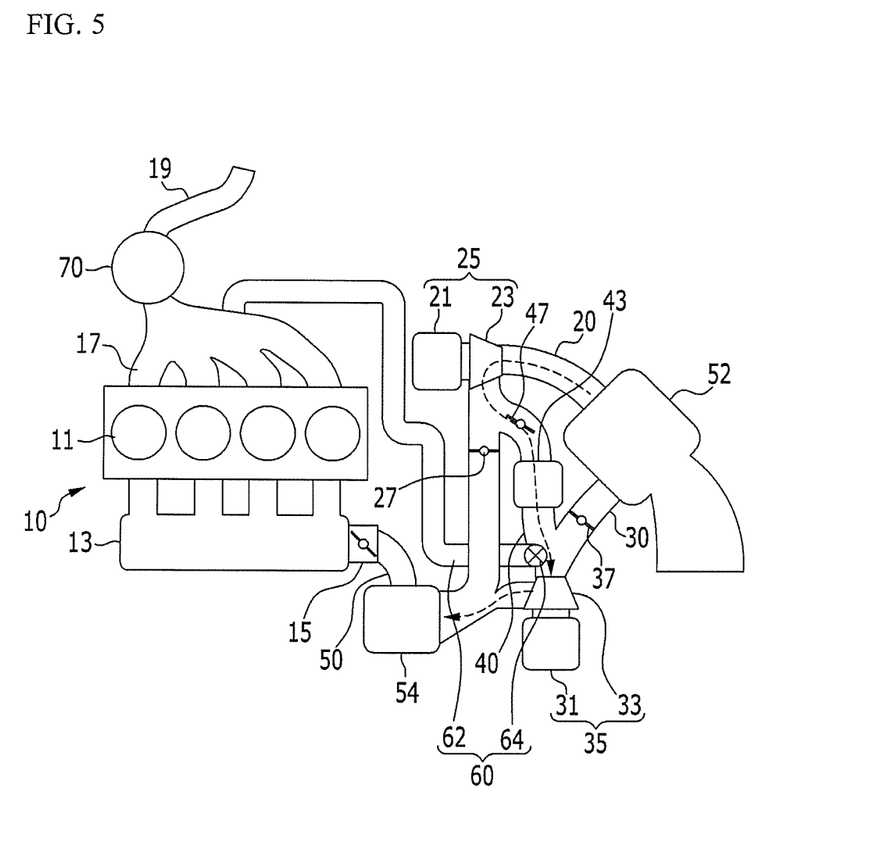
FIG. 5 is a schematic view for explaining a low/medium speed high load region of an engine system according to an exemplary embodiment of the present disclosure.

Referring to FIG. 5, if the driving region of the engine is the low/medium speed high load region, as the controller 90 controls the first intake valve 27 and the second intake valve 37 to be blocked and controls the opening of the bypass valve 47, the supercharged air amount supplied to the combustion chamber 11 is controlled. The controller 90 operates the first electric supercharger 25 and the second electric supercharger 35 so that the supercharged air is supplied to the combustion chamber 11 by the first electric supercharger 25 and the second electric supercharger 35.

That is, the outside air inflowed to the first intake line is firstly boosted by the first electric supercharger 25 and inflows to the second intake line 30 through the bypass line 40. The outside air is additionally boosted through the second electric supercharger 35.

Since high compress ratio is required in the low/medium speed high load region, the compress ratio of the outside air supplied to the combustion chamber 11 may be increased by driving the first electric supercharger 25 and the second electric supercharger 35 in series. As the outside air that is firstly boosted through the first electric supercharger 25 is cooled through the secondary intercooler 43 installed on the bypass line 40, a compress efficiency of the outside air may be improved.

Figure 6:
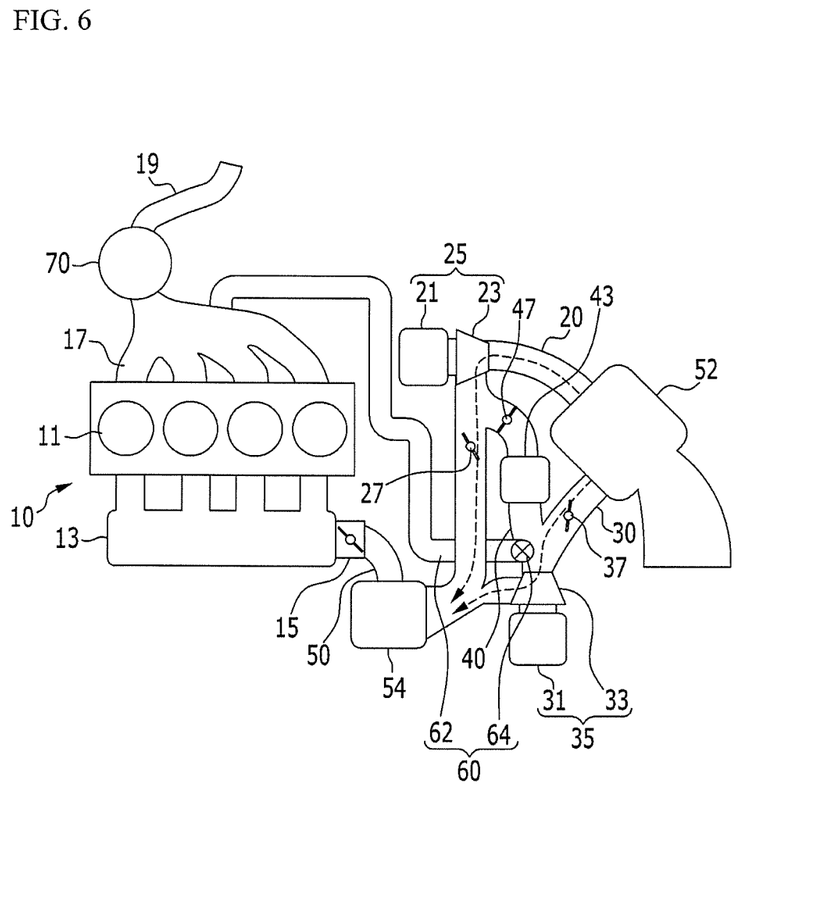
FIG. 6 is a schematic view for explaining a high speed high load region of an engine system according to an exemplary embodiment of the present disclosure.

Referring to FIG. 6, if the driving region of the engine is the high speed high load region, as the controller 90 controls the bypass valve 47 to be blocked and adjusts the opening of the first intake valve 27 and the second intake valve 37, the supercharged air amount supplied to the combustion chamber 11 is adjusted. Also, the controller 90 operates the first electric supercharger 25 and the second electric supercharger 35 such as the air supercharged by the first electric supercharger 25 and the second electric supercharger 35 is supplied to the combustion chamber 11.

Since the larger amount of the outside air is required in the high speed high load region, the intake air is supplied to the combustion chamber 11 through the first intake line 20 and the second intake line 30. That is, by driving the first electric supercharger 25 and the second electric supercharger 35 in parallel, the large amount of the intake air may be supplied to the combustion chamber 11.

Figure 7:
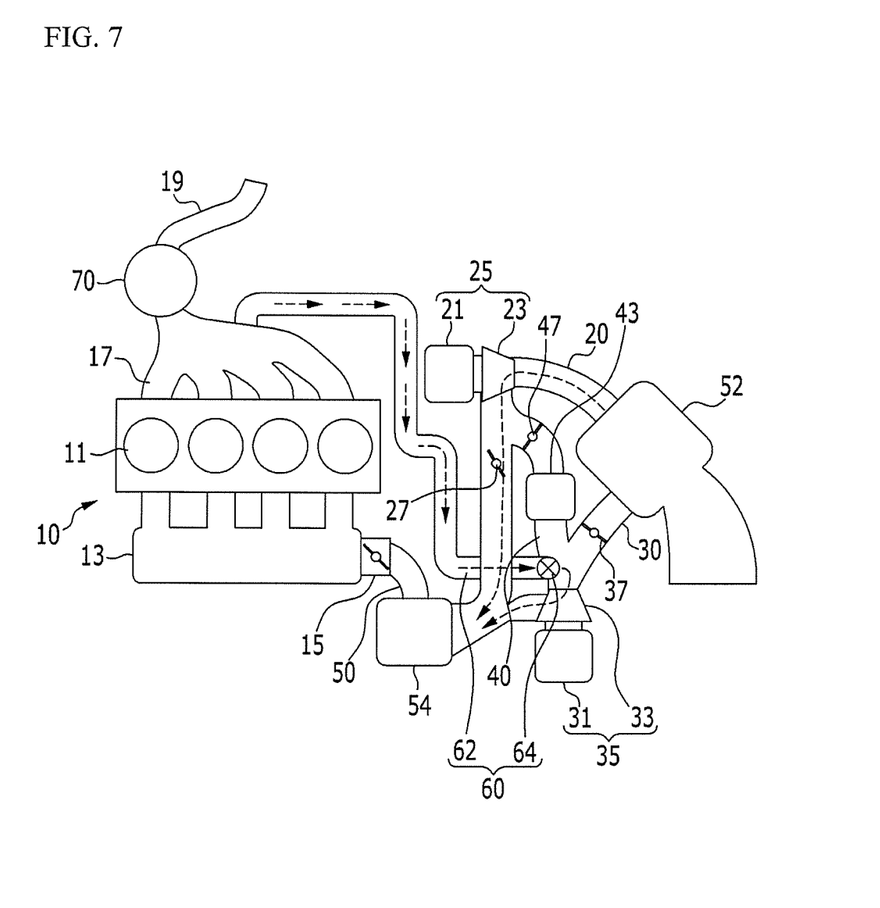
FIG. 7 is a schematic view for explaining an operation to supply a recirculation gas of an engine system according to an exemplary embodiment of the present disclosure.

Referring to FIG. 7, in the driving region that the recirculation gas is supplied to the combustion chamber 11 of the engine 10 through the EGR device 60, the controller 90 controls the second intake valve and the recirculation valve 64 to be closed and operates the second electric supercharger, controls the first intake valve to be opened, operates the first electric supercharger, and controls the recirculation valve 64 to be opened.

In this case, the supercharged air amount is controlled according to the operation of the first electric supercharger. When supplying the recirculation gas to the combustion chamber 11, after the second intake valve and the bypass valve are blocked and the recirculation valve 64 is opened, if the second electric supercharger is operated, the second electric supercharger performs a kind of a pump function.

Figure 8:
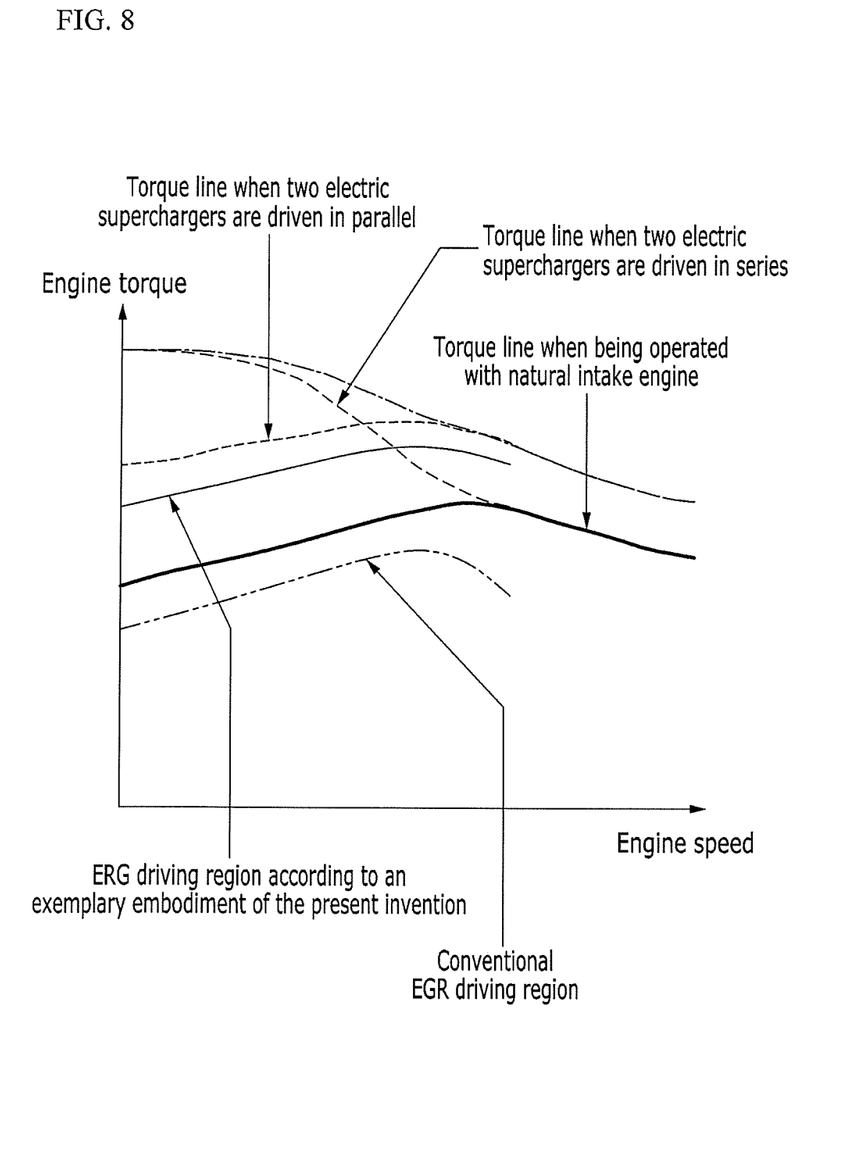
FIG. 8 is a graph of a driving region of an engine according to an exemplary embodiment of the present disclosure.

Accordingly, even if the supercharged air is supplied by the first electric supercharger, because the recirculation gas is supplied to the combustion chamber 11 by the second electric supercharger, the EGR driving region to supply the recirculation gas extends (referring to FIG. 8).

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An engine system comprising:
   an engine including a combustion chamber generating a driving torque by combustion of a fuel;
   a plurality of intake lines though which outside air flows to the combustion chamber;
   an exhaust manifold connected to the combustion chamber at an exhaust side;
   a plurality of electric superchargers disposed on the plurality of intake lines, respectively; and
   an exhaust gas recirculation (EGR) device including:
      a recirculation line branched from the exhaust manifold and joined to one of the plurality of intake lines; and
      a recirculation valve disposed on the recirculation line,
   wherein the plurality of intake lines include:
      a first intake line through which outside air is supplied to the combustion chamber;
      a second intake line through which outside air is supplied to the combustion chamber; and
      a bypass line connecting the first intake line and the second intake line,
   wherein the engine system further comprises:
      a first intake valve disposed on the first intake line;
      a second intake valve disposed on the second intake line; and
      a bypass valve disposed on the bypass line,
   wherein the plurality of electric superchargers include a first electric supercharger and a second electric supercharger,
   wherein the first intake valve is disposed on a lower stream of the first electric supercharger,
   wherein the second intake valve is disposed on an upper stream of the second electric supercharger, and
   wherein the recirculation line is branched from the exhaust manifold and joined to the second intake line between the second intake valve and the second electric supercharger.

2. The engine system of claim 1, wherein the recirculation line is branched from the exhaust manifold and joined to the bypass line between the bypass valve and the second electric supercharger.

3. The engine system of claim 2, wherein, in a driving region that recirculation gas is supplied to the combustion chamber from the EGR device, the first intake valve is open to operate the first electric supercharger by outside air and the second intake valve and the recirculation valve are closed to operate the second electric supercharger by recirculation gas.

4. The engine system of claim 1, wherein, in a driving region that recirculation gas is supplied to the combustion chamber from the EGR device, the first intake valve is open to operate the first electric supercharger by outside air and the second intake valve and the recirculation valve are closed to operate the second electric supercharger by recirculation gas.

5. The engine system of claim 1, wherein the first intake line and the second intake line are joined to a main intake line, and
   wherein a main intercooler is disposed on the main intake line.

6. The engine system of claim 1, further comprising a secondary intercooler disposed on the bypass line.

7. An engine system comprising:
   an engine including a combustion chamber generating a driving torque by combustion of a fuel;
   a plurality of intake lines through which outside air flows to the combustion chamber;
   an exhaust manifold connected to the combustion chamber at an exhaust side;
   an exhaust line which is connected to the exhaust manifold and through which exhaust gas flows;
   an exhaust gas purification device disposed on the exhaust line;

a plurality of electric superchargers disposed on the plurality of intake lines, respectively; and an EGR device including:
- a recirculation line branched from the exhaust line at a lower stream of the exhaust gas purification device and joined to one of the plurality of intake lines; and
- a recirculation valve disposed on the recirculation line, wherein the plurality of intake lines include:
- a first intake valve disposed on a first intake line through which outside air is supplied to the combustion chamber;
- a second intake valve disposed on a second intake line through which outside air is supplied to the combustion chamber; and
- a bypass valve disposed on a bypass line connecting the first intake line and the second intake line, wherein the plurality of electric superchargers include a first electric supercharger and a second electric supercharger, wherein the first intake valve is disposed on a lower stream of the first electric supercharger, wherein the second intake valve is disposed on an upper stream of the second electric supercharger, and wherein the recirculation line is branched from the exhaust manifold and joined to the second intake line between the second intake valve and the second electric supercharger.

8. The engine system of claim 7, wherein the recirculation line is branched from the exhaust manifold and joined to the bypass line between the bypass valve and the second electric supercharger.

9. The engine system of claim 8, wherein, in a driving region that recirculation gas is supplied to the combustion chamber, the first intake valve is open to operate the first electric supercharger by outside air and the second intake valve and the recirculation valve are closed to operate the second electric supercharger by recirculation gas.

10. The engine system of claim 7, wherein, in a driving region that recirculation gas is supplied to the combustion chamber, the first intake valve is open to operate the first electric supercharger by outside air and the second intake valve and the recirculation valve are closed to operate the second electric supercharger by recirculation gas.

11. The engine system of claim 7, wherein the first intake line and the second intake line are joined to a main intake line, and wherein a main intercooler is disposed on the main intake line.

12. The engine system of claim 7, further comprising a secondary intercooler disposed on the bypass line.

* * * * *